United States Patent
Schroeder et al.

(10) Patent No.: US 6,327,626 B1
(45) Date of Patent: Dec. 4, 2001

(54) METHOD AND APPARATUS FOR MSS SPOOFING

(75) Inventors: Theodore Schroeder, San Jose; John Hayes, Santa Cruz; Wayne Hathaway, Sunnyvale, all of CA (US)

(73) Assignee: Alteon Networks, Inc., San Jose, CA (US)

(*) Notice: Subject to any disclaimer, the term of this patent is extended or adjusted under 35 U.S.C. 154(b) by 0 days.

(21) Appl. No.: 09/153,585

(22) Filed: Sep. 15, 1998

(51) Int. Cl.$^7$ ............................................. G06F 13/00
(52) U.S. Cl. ..................... 709/236; 709/227; 709/230; 709/237; 709/238
(58) Field of Search ................................. 709/227, 230, 709/236, 238, 239, 240, 246, 237

(56) References Cited

U.S. PATENT DOCUMENTS

| | | | |
|---|---|---|---|
| 5,425,023 | * 6/1995 | Haraguchi et al. | 370/400 |
| 5,751,970 | * 5/1998 | Bournas | 709/236 |
| 6,076,114 | * 6/2000 | Wesley | 709/235 |
| 6,091,733 | * 7/2000 | Takagi et al. | 370/401 |

OTHER PUBLICATIONS

Hastings et al., "TCP/IP spoofing fundamentals", IEEE Fifteenth Annual International Phoenix Conference, pp. 218–224, Mar. 1996.*

RFC 0791 Internet Protocol—Darpa Internet Program Protocol Specification, Information Sciences Institute, University of Southern California, pp. 1–45, Sep. 1981.*

RFC 0793 Transmission Control Protocol—Darpa Internet Program Protocol Specification, Information Sciences Institute, University of Southern California, pp. 1–85, Sep. 1981.*

* cited by examiner

Primary Examiner—Robert B. Harrell
Assistant Examiner—Almari Romero
(74) Attorney, Agent, or Firm—Michael A. Glenn

(57) ABSTRACT

A mechanism, referred to as MSS spoofing, intercepts and modifies the MSS value specified in a TCP SYN packet containing a TCP MSS option. As a result, the local TCP protocol stack is "spoofed" (i.e. made to believe) such that it appears to the local stack that the remote station has an MSS value that is different from its actual MSS value. MSS spoofing allows the local TCP protocol stack to use an MSS value that is derived solely from its own MTU. The interface changes the received MSS value to a value that is at least as large as the local MTU before passing the packet up the protocol stack. This forces the TCP protocol stack to use a larger MSS value than it would otherwise use. In this way, the TCP protocol stack always uses a TCP segment size that is based on the MTU of the local interface. The mechanism described herein allows a host using the TCP transport protocol to choose the larger of two unequal MSS values received during MSS negotiation when establishing a connection between two stations. As a result, the determination mechanism of the local MSS value used by the TCP/IP protocol stack is changed to be the larger of two unequal offered MSS values, instead of being the smaller of the two, without modifying the host TCP/IP protocol stack. Accordingly, a transmitting host can send TCP segments that are sized to the sending station MTU without modifying the TCP protocol stack on every station.

25 Claims, 4 Drawing Sheets

METHOD AND APPARATUS FOR MSS SPOOFING

BACKGROUND OF THE INVENTION

1. Technical Field

The invention relates to computer networks. More particularly, the invention relates to a computer network protocol.

2. Description of the Prior Art

TCP/IP is a well known information exchange protocol. See, for example, J. Postel, *Internet Protocol*, RFC791 (September 1981); J. Postel, *Internet Control Message Protocol*, RFC792 (September 1981); J. Postel, *Transmission Control Protocol*, RFC793 (September 1981); R. Braden, *Requirements for Internet Hosts—Communications Layers*, RFC1122 (October 1989); V. Jacobsen, R. Braden, *TCP Extensions for Long-Delayed Paths*, RFC1072 (October 1988); J. Postel, *The TCP Maximum Segment Size and Related Topics*, RFC879 (November 1983); and J. Mogul, S. Deering, *Path MTU Discovery*, RFC1191 (November 1990).

When a TCP connection sends a segment, the size of that segment is limited by the Maximum Segment Size (MSS) and the path Maximum Transmission Unit (MTU). The MSS used by the local TCP protocol stack is set during the establishment of each TCP connection. The MSS used by each station is determined independently using the following algorithm:

Each end station sends a desired MSS to the remote endpoint in the SYN packet. This desired MSS is the MTU of the interface being used, minus the IP and TCP frame overhead (typically 40 bytes).

Each end station then derives an MSS value to be used, which is the minimum of the MSS received in the SYN packet and the MTU of the local interface, minus the IP and TCP frame overhead.

When two networks having different MTUs are connected, each resulting MSS used by each end station is the smaller of the two MSSs. In addition, if the MSS is larger than the empirically determined path MTU, only segments conforming to the path MTU are sent. This allows communications to occur without the need for IP fragmentation, but removes the efficiency and performance advantages provided by interfaces having larger MTUs.

It would be desirable to allow a host using the TCP transport protocol to choose the larger of two unequal MSS values received during the MSS negotiation when establishing a connection between two stations.

SUMMARY OF THE INVENTION

It is therefore an object of the present invention to increase the data transfer rate in network by removing the limitation provided by current systems. A mechanism referred to as MSS spoofing intercepts and modifies the MSS value specified in a TCP SYN packet containing a TCP MSS option. The local TCP protocol stack is spoofed such that it appears to the local stack that the remote station has an MSS value that is different from its actual MSS value. Thus, MSS spoofing allows the local TCP protocol stack to use an MSS value that is derived solely from its own MTU.

The MSS spoofing interface changes the received MSS value to a value at least as large as the local MTU before passing the packet up the protocol stack. This forces the TCP protocol stack to use a larger MSS that it would otherwise use. This way, the TCP protocol stack always uses a TCP segment size that is based on the MTU of the local interface.

In another embodiment, MSS spoofing may be implemented on any intermediate point between two TCP protocol entities, for example, in the device driver or network interface card (NIC). MSS spoofing may also be implemented in an intermediate routing or switching entity.

The mechanism described allows a host using the TCP transport protocol to choose the larger of two unequal MSS values received during MSS negotiation when establishing a connection between two stations. As a result, the determination mechanism of the local MSS value used by the TCP/IP protocol stack is changed to be the larger of the two unequal offered MSS values, instead of being the smaller of the two. The host TCP/IP protocol stack is not modified. Thus, a transmitting host can send TCP segments that are sized to the sending station MTU without modifying the TCP protocol stack on every station.

DETAILED DESCRIPTION OF THE INVENTION

The invention provides a mechanism, referred to as MSS spoofing, that intercepts and modifies the MSS value specified in a TCP SYN packet containing a TCP MSS option. As a result, the local TCP protocol stack is "spoofed" (i.e. made to believe) such that it appears to the local stack that the remote station has an MSS value that is different from its actual MSS value. Thus, MSS spoofing allows the local TCP protocol stack to use an MSS value that is derived solely from its own MTU.

The MSS spoofing interface changes the received MSS value to a value at least as large as the local MTU before passing the packet up the protocol stack. This forces the TCP protocol stack to use a larger MSS value than it would otherwise use. In this way, the TCP protocol stack always uses a TCP segment size that is based on the MTU of the local interface.

MSS spoofing may be implemented on any intermediate point between two TCP protocol entities, e.g. in the device driver or network interface card (NIC). MSS spoofing may also be implemented in an intermediate routing or switching entity.

The mechanism described herein allows a host using the TCP transport protocol to choose the larger of two unequal MSS values received during MSS negotiation when establishing a connection between two stations. As a result, the determination mechanism of the local MSS value used by the TCP/IP protocol stack is changed to be the larger of two unequal offered MSS values, instead of being the smaller of the two, without modifying the host TCP/IP protocol stack. Accordingly, a transmitting host can send TCP segments that are sized to the sending station MTU without modifying the TCP protocol stack on every station.

Figure 1:
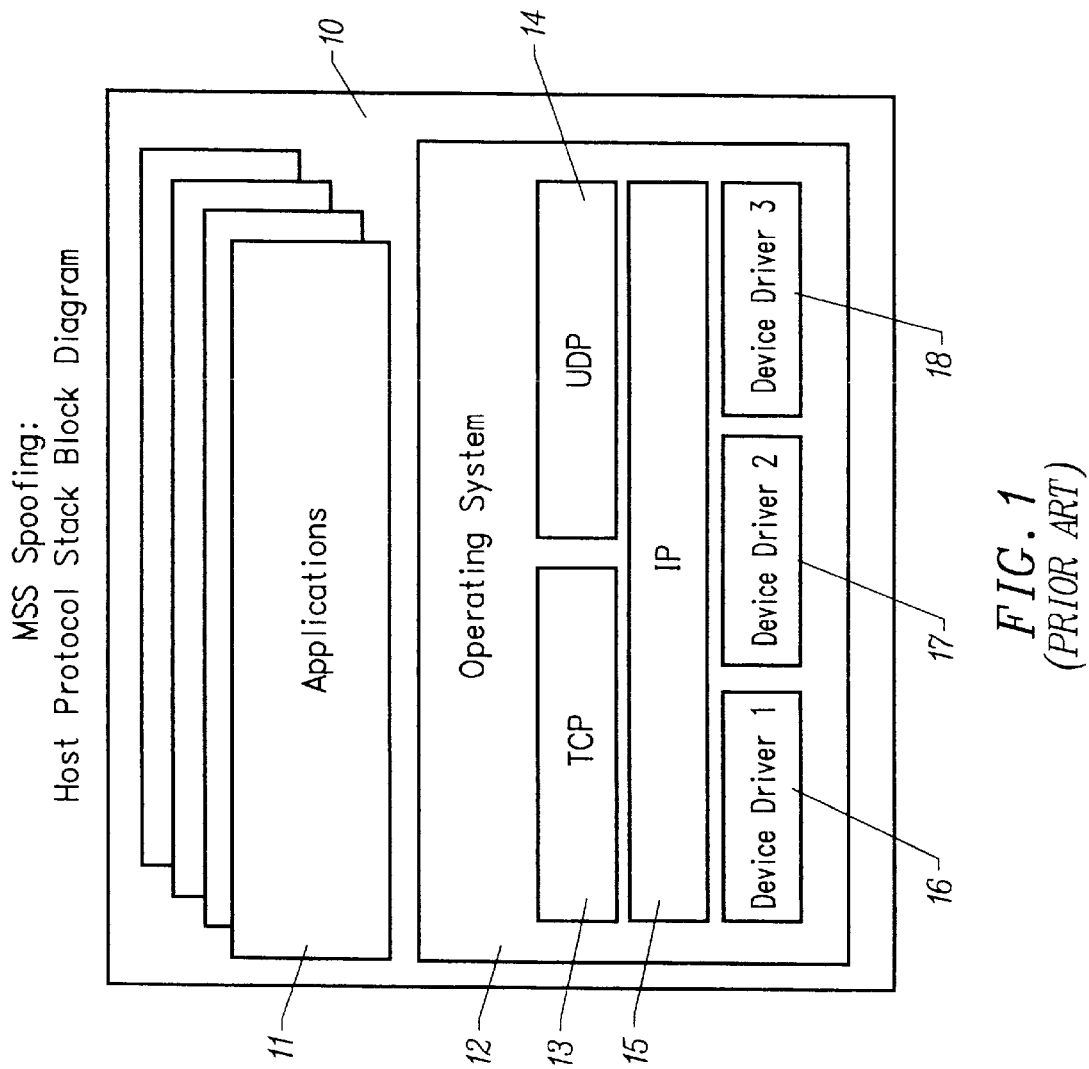
FIG. 1 is a block schematic diagram of a system, including a host protocol stack.

FIG. 1 is a block schematic diagram of a system, including a host protocol stack. Within the system 10, various applications 11 may be run on an operating system 12. Such applications may include communications programs that allow a user to send and receive information over a network.

Communications facilities are provided within the operating system to allow the exchange of information between systems over a network, such as the Internet. The operating system shown in FIG. 1 provides TCP/IP capability and therefore includes a transmission control program (TCP) layer 13 and an Internet protocol (IP) layer 15. A User Datagram Protocol (UDP) layer 14 is also provided. The IP layer exchanges information with the network via various device drivers 16, 17, 18.

Figure 2:
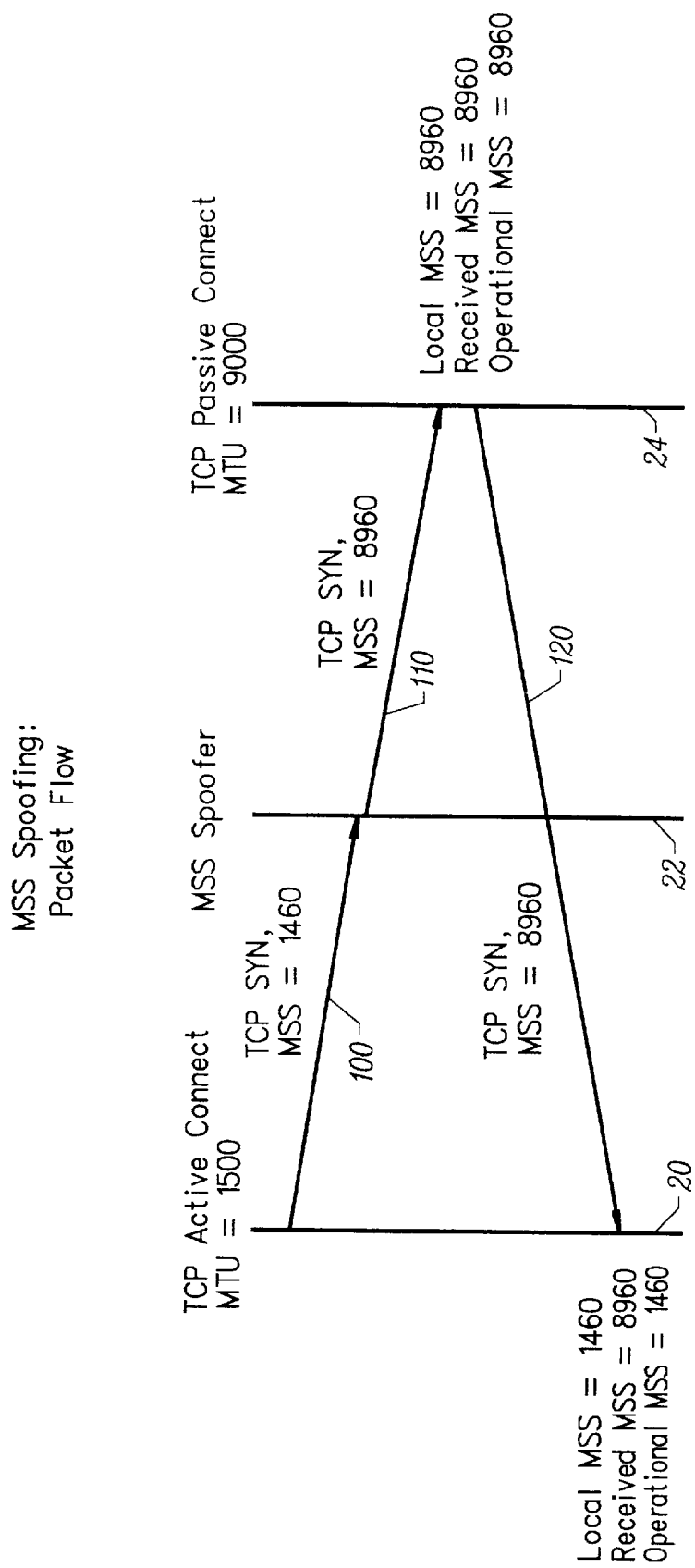
FIG. 2 is a block schematic diagram showing MSS spoofing according to the invention.

FIG. 2 is a block schematic diagram showing MSS spoofing according to the invention. In FIG. 2, a first station 20 provides an active TCP connection having an MTU value of 1500. It will be appreciated by those skilled in the art that the values herein are provided for purposes of example only and that the invention is readily applicable to applications in which any desired values are used.

In this example, a TCP SYN packet having an MSS value of 1460 is sent (100) to the MSS spoofer 22. The MSS spoofer is in communication with a second station 24 which provides a passive TCP connection having an MTU value of 9000. The MSS spoofer sends a TCP SYN packet having an MSS value of 8960 (110). That is, the MSS spoofer changes the received MSS value (i.e. 1460) to a value that is as large of the MSS value of the second station (i.e. 8960). Thus, a station having a local MSS value of 8960 (such as the second station) receives an MSS packet having a value of 8960. Communications from the second station 24 to the first station 20 may proceed because the TCP SYN packet sent by the second station has an MSS value of 8960 (120), and is thus larger than the local MSS value of the first station. In this way, the second station is spoofed into communicating at an efficient MSS value with a station having an otherwise less efficient MSS value for the second station.

Figure 3:
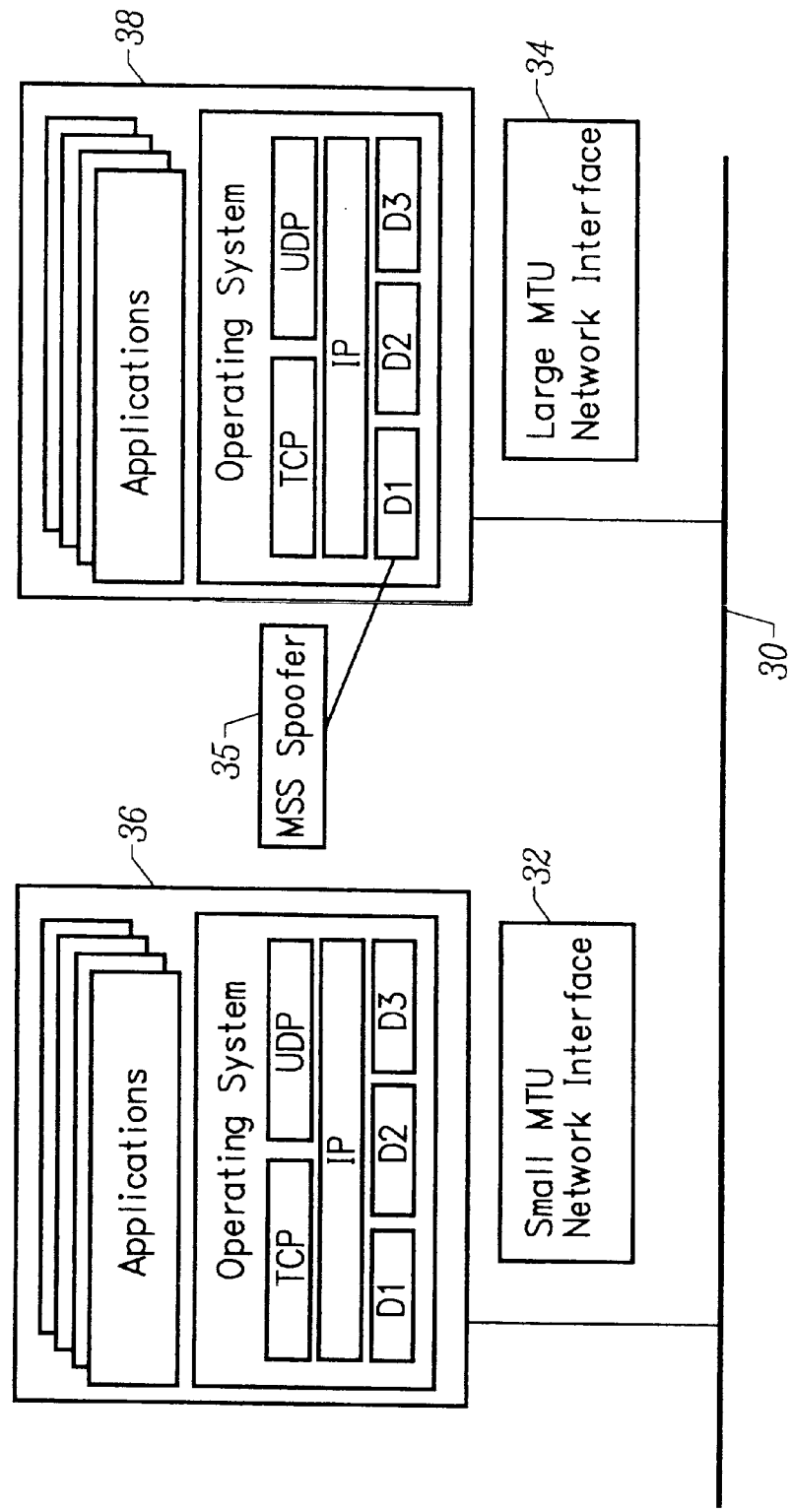
FIG. 3 is a block schematic diagram showing MSS spoofing in a host according to the invention.

FIG. 3 is a block schematic diagram showing MSS spoofing in a host according to the invention. In FIG. 3, a network 30 includes a first station 36 having a small MTU network interface 32 and a second station 38 having a large MTU network interface 34. The invention adds the MSS spoofer 35 to the second station. The MSS spoofer intercepts small MSS packets received from the first station and changes them such that the packets appear to the second station to have a larger value than the actual packet value.

Figure 4:
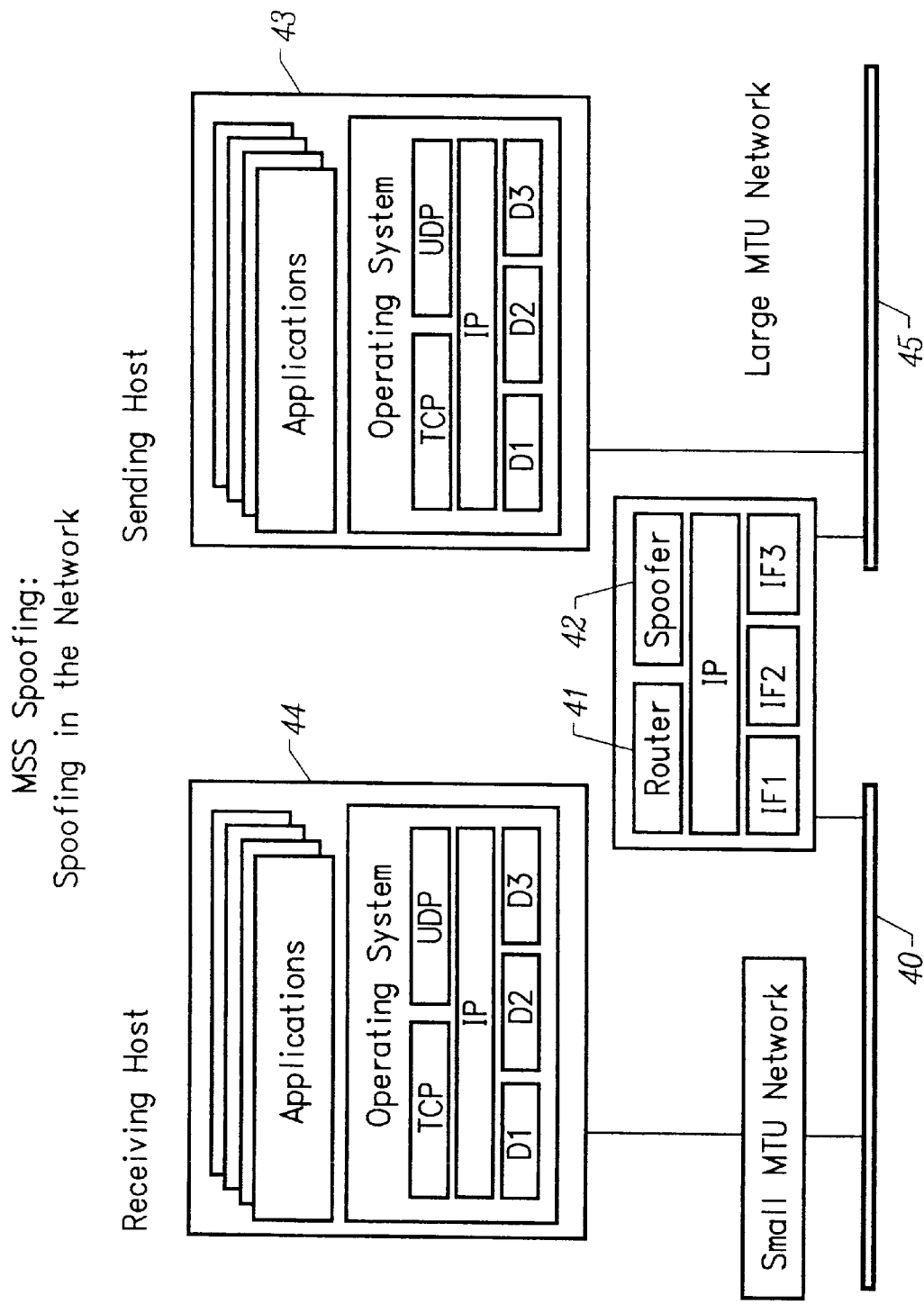
FIG. 4 is a block schematic diagram showing MSS spoofing in a network according to the invention.

FIG. 4 is a block schematic diagram showing MSS spoofing in a network according to the invention. In the figure, a network having a small MTU value 40 is in communication with a network having a large MTU value 45 via a router 41. MSS packets sent from a receiving host 44 are forwarded through the router via an MSS spoofer 42. The MSS spoofer changes the value of the MSS packet such that a sending host 43 on the large MTU network receives MSS packets that appear to have a value larger than their actual value.

The preferred MSS spoofer operates in accordance with the algorithm shown in Table 1 below.

TABLE 1

MSS Spoofing

IF the protocol is TCP
AND the TCP SYN bit is set
AND there are TCP options present
THEN
    set the option pointer to the start of the TCP options
    set DONE to FALSE
    WHILE not DONE do
        IF the option pointer points to the MSS option TABLE 1-continued MSS Spoofing THEN
            IF the TCP window size is non-zero
            THEN
                set the new MSS to the minimum of TCP
                window size divided by two and the MSS
                of the local interface. Remark: This uses
                the actual window size as a surrogate for
                the remote station's transmit buffer.
                Using at most half of this value insures
                that the receiver sees at least two full
                MSSs and does not delay ACKs, as
                required in RFC1122.
            ELSE
                set the new MSS to the MSS of the local
                interface
            set the MSS in the TCP options to the new MSS
            correct the TCP checksum
            set DONE to TRUE
        ELSE IF the option pointer points to the END option
            set DONE to TRUE
        ELSE increment option pointer by length of the
        current option
ENDWHILE With regard to the invention, the following should be noted:

The receipt of large segments that are the result of MSS spoofing may affect the operation of some delayed ACK algorithms. The preferred embodiment of the invention is compatible with both the Van Jacobsen algorithm, described in RFC1122, and the Nagle congestion avoidance algorithm.

MSS spoofing should be implemented as close to the spoofed host as possible. In the preferred embodiment of the invention, this location is in the NIC or driver (as shown in FIG. 3), although the invention is also readily implemented in a routing or switching entity (as shown in FIG. 4).

The implementor of the MSS spoofing algorithm should b aware of the TCP window scale option when calculating the TCP widow size.

RFC879 is explicitly disregarded.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An apparatus for forwarding data packets from a host station, to a sending station, in which said data packets are sized to a sending station transmission unit size without modifying the sending station protocol stack, comprising:

means for intercepting a data packet sent from said host station to said sending station; and means for modifying a data packet value specified in said intercepted data packet;

wherein said sending station protocol stack is spoofed such that it appears to said sending station protocol stack that said host station has a data packet size that is different from its actual data packet size; and wherein said sending station protocol stack uses a data packet size that is derived solely from its own transmission unit size.

2. The apparatus of claim 1, wherein said protocol stack implements the TCP/IP protocol.

3. The apparatus of claim 2, further comprising:
a maximum segment size (MSS) spoofing interface that changes a received MSS value to a value at least as large as a local maximum transfer unit (MTU) before passing said data packet up said protocol stack;
wherein said protocol stack is forced to use a larger MSS value than it would otherwise use; and
wherein said protocol stack uses a TCP segment size that is based on the MTU of a local interface.

4. The apparatus of claim 1, wherein said means for intercepting and said means for modifying are implemented on an intermediate point between two entities.

5. The apparatus of claim 4, wherein said means for intercepting and said means for modifying are implemented in any of a device driver and network interface card (NIC).

6. The apparatus of claim 4, wherein said means for intercepting and said means for modifying are implemented in any of an intermediate routing entity and a switching entity.

7. An apparatus for forwarding data packets using the TCP transport protocol, comprising:
a first station having a first maximum transfer unit (MTU) value;
a second station having a second MTU value;
a maximum segment size (MSS) spoofer in communication with said second station for sizing data packets sent to said second from said first station to said second station MTU value without modifying said second station protocol stack.

8. The apparatus of claim 7, wherein said MSS spoofer changes a received MSS value to a value that is as large of the MSS value of said second station;
wherein said second station is spoofed into communicating at an efficient MSS value with a station having an otherwise less efficient MSS value for said second station.

9. The apparatus of claim 7, wherein said first station further comprises a small MTU network interface; and
wherein said second station further comprises a large MTU network interface.

10. The apparatus of claim 7, wherein said MSS spoofer is located proximate to said second station.

11. The apparatus of claim 7, wherein said MSS spoofer intercepts small MSS packets received from said first station and changes them such that the packets appear to said second station to have a larger MSS value than the actual MSS value.

12. The apparatus of claim 7, wherein said first station is located on a network having a small MTU; and
wherein said second station is located on a network having a large MTU;
said apparatus further comprising:
means for communicating between said small MTU network and said large MTU network;
wherein MSS packets sent from said first station are forwarded through said communicating means via said MSS spoofer;
wherein said MSS spoofer changes the value of MSS packets such that said second station on said large MTU network receives MSS packets that appear to have a value larger than their actual value.

13. A method for forwarding data packets from a host station, to a sending station, in which said data packets are sized to a sending station transmission unit size without modifying the sending station protocol stack, comprising the steps of:
intercepting a data packet sent from said host station to said sending station; and
modifying a data packet value specified in said intercepted data packet;
wherein said sending station protocol stack is spoofed such that it appears to said sending station protocol stack that said host station has a data packet size that is different from its actual data packet size; and
wherein said sending station protocol stack uses a data packet size that is derived solely from its own transmission unit size.

14. The method of claim 13, wherein said protocol stack implements the TCP/IP protocol.

15. The method of claim 14, further comprising the step of:
providing a maximum segment size (MSS) spoofing interface that changes a received MSS value to a value at least as large as a local maximum transfer unit (MTU) before passing said data packet up said protocol stack;
wherein said protocol stack is forced to use a larger MSS value than it would otherwise use; and
wherein said protocol stack uses a TCP segment size that is based on the MTU of a local interface.

16. The method of claim 13, wherein said means for intercepting and said means for modifying are implemented on an intermediate point between two entities.

17. The method of claim 16, wherein said means for intercepting and said means for modifying are implemented in any of a device driver and network interface card (NIC).

18. The method of claim 16, wherein said means for intercepting and said means for modifying are implemented in any of an intermediate routing entity and a switching entity.

19. A method for forwarding data packets using the TCP transport protocol, comprising the steps of:
providing a first station having a first maximum transfer unit (MTU) value;
providing a second station having a second MTU value;
providing a maximum segment size (MSS) spoofer in communication with said second station for sizing data packets sent to said second from said first station to said second station MTU value without modifying said second station protocol stack.

20. The method of claim 19, wherein said MSS spoofer changes a received MSS value to a value that is as large of the MSS value of said second station;
wherein said second station is spoofed into communicating at an efficient MSS value with a station having an otherwise less efficient MSS value for said second station.

21. The method of claim 19, wherein said first station comprises a small MTU network interface; and
wherein said second station comprises a large MTU network interface.

22. The method of claim 19, wherein said MSS spoofer is located proximate to said second station.

23. The method of claim 19, wherein said MSS spoofer intercepts small MSS packets received from said first station and changes them such that the packets appear to said second station to have a larger MSS value than the actual MSS value.

24. The method of claim 19, wherein said first station is located on a network having a small MTU; and wherein said second station is located on a network having a large MTU;

said method further comprising the step of:

communicating between said small MTU network and said large MTU network;

wherein MSS packets sent from said first station are forwarded through said communicating means via said MSS spoofer;

wherein said MSS spoofer changes the value of MSS packets such that said second station on said large MTU network receives MSS packets that appear to have a value larger than their actual value.

25. The method of claim 19, wherein MSS spoofing is implemented as close to the second station as possible.

* * * * *